(12) United States Patent
Musallam

(10) Patent No.: US 11,030,234 B2
(45) Date of Patent: Jun. 8, 2021

(54) METHOD AND SYSTEM FOR SHARING AN ITEM OF MEDIA CONTENT

(71) Applicant: Ibrahim Ali Musallam, Jeddah (SA)

(72) Inventor: Ibrahim Ali Musallam, Jeddah (SA)

(*) Notice: Subject to any disclaimer, the term of this patent is extended or adjusted under 35 U.S.C. 154(b) by 215 days.

(21) Appl. No.: 16/210,089

(22) Filed: Dec. 5, 2018

(65) Prior Publication Data

US 2019/0171664 A1 Jun. 6, 2019

Related U.S. Application Data

(60) Provisional application No. 62/594,749, filed on Dec. 5, 2017.

(30) Foreign Application Priority Data

Dec. 5, 2017 (GB) ...................................... 1720286

(51) Int. Cl.

| G06F 16/48 | (2019.01) |
|---|---|
| G06F 16/487 | (2019.01) |
| G06F 16/44 | (2019.01) |
| H04W 4/029 | (2018.01) |
| H04N 21/475 | (2011.01) |
| H04N 21/45 | (2011.01) |

(Continued)

(52) U.S. Cl.
CPC .......... *G06F 16/487* (2019.01); *G06F 16/444* (2019.01); *G06T 13/80* (2013.01); *G06T 17/05* (2013.01); *G06T 19/003* (2013.01); *H04N 21/4524* (2013.01); *H04N 21/4756* (2013.01); *H04W 4/029* (2018.02)

(58) Field of Classification Search
CPC ...... G06F 16/487; G06F 16/444; G06T 13/80
See application file for complete search history.

(56) References Cited

U.S. PATENT DOCUMENTS 8,392,710 B2 3/2013 Tie et al.
9,791,291 B1 10/2017 Yamashita et al.
(Continued)

FOREIGN PATENT DOCUMENTS

| CN | 101165701 A | 4/2008 |
|---|---|---|
| CN | 101242323 A | 8/2008 |

(Continued)

OTHER PUBLICATIONS

Research on Authentication and key Exchange Protocol for RFID System, School of Information Security Engineering, Jan. 18, 2010.

*Primary Examiner* — Loc Tran
(74) *Attorney, Agent, or Firm* — Arent Fox LLP

(57) ABSTRACT

A system and method for sharing an item of media content is described. An exemplary method includes associating a first location with the item of media content at a first mobile device and sending a request to view the item of media content to a second mobile device at a second location. The method includes showing a recipient of the item of media content a simulated journey from the recipient's location to a location associated with the item of media content. The simulated journey includes zooming out from the recipient's location shown on a map, following a path between the recipient's location and the location associated with the item of media content, and zooming into the location associated with the item of media content.

20 Claims, 10 Drawing Sheets

(51) Int. Cl.
*G06T 13/80* (2011.01)
*G06T 17/05* (2011.01)
*G06T 19/00* (2011.01)

(56) References Cited

U.S. PATENT DOCUMENTS

| | | |
|---|---|---|
| 2006/0143453 A1 | 6/2006 | Imamoto et al. |
| 2008/0147317 A1 | 6/2008 | Ohn |
| 2008/0307311 A1 | 12/2008 | Eyal |
| 2008/0313464 A1 | 12/2008 | Fascenda et al. |
| 2009/0094372 A1 | 4/2009 | Nyang et al. |
| 2010/0153731 A1 | 6/2010 | Duc et al. |
| 2010/0191459 A1* | 7/2010 | Carter ............... H04N 1/00323 701/532 |
| 2012/0124508 A1 | 5/2012 | Morin et al. |
| 2013/0117692 A1 | 5/2013 | Padmanabhan et al. |
| 2013/0325319 A1 | 12/2013 | Moore et al. |
| 2014/0368601 A1* | 12/2014 | deCharms ............. H04W 4/029 348/14.02 |
| 2016/0102983 A1 | 4/2016 | Javed et al. |
| 2016/0153789 A1 | 6/2016 | Gallar et al. |
| 2017/0103081 A1 | 4/2017 | Jones et al. |

FOREIGN PATENT DOCUMENTS

| | | |
|---|---|---|
| CN | 101286844 A | 10/2008 |
| CN | 101364875 A | 2/2009 |
| CN | 101364876 A | 2/2009 |
| CN | 100544249 C | 9/2009 |
| CN | 101645899 A | 2/2010 |
| CN | 101754213 A | 6/2010 |
| CN | 101853369 A | 10/2010 |
| EP | 1526677 A | 4/2004 |
| EP | 2073430 A | 6/2009 |
| EP | 2211498 A | 7/2010 |
| EP | 2395735 A2 | 12/2011 |
| WO | 2009139629 A1 | 11/2009 |

* cited by examiner

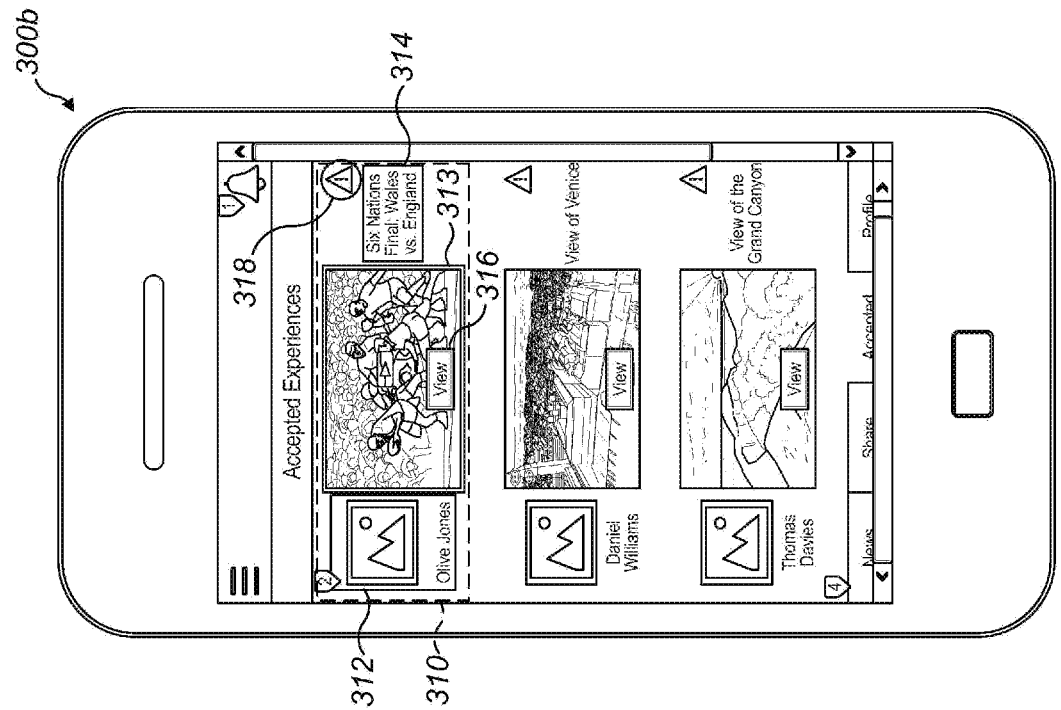
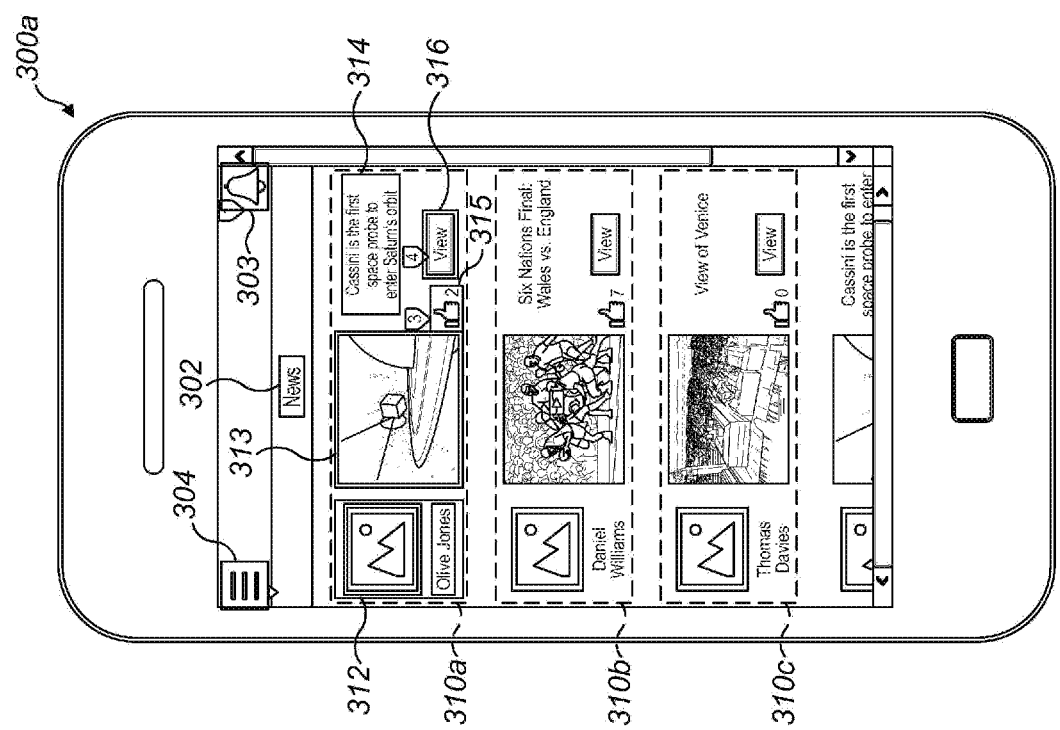
FIG. 3B
FIG. 3A

METHOD AND SYSTEM FOR SHARING AN ITEM OF MEDIA CONTENT

CROSS REFERENCE TO RELATED APPLICATIONS

The present application claims benefit of priority to U.S. Provisional Application No. 62/594,749, filed on Dec. 5, 2017 and UK application GB1720286.2, which was also filed on 5 Dec. 2017, the entire contents of which are incorporated herein by reference.

TECHNICAL FIELD

This invention relates to systems and methods for sharing an item of media content.

BACKGROUND

Numerous social media platforms enable a user to share media content with their social network and other users of the social media platform. A recipient of the media content may gain an enhanced understanding or appreciation of the media content if the users enriches the media content with additional information. For example, the shared media content can be marked, or 'geotagged,' with a geographical identification. The geotag records the location where the media content was captured and enables the recipient of the media content to gain a greater understanding of the geographical context relating to the media content.

However, the use of geotag data by social media platforms is currently limited to indicating where an item of media content was captured on a separate map. Although a recipient can view the origin of the media content on the map, there is very little other geographical context with which to interpret the media content. There is therefore a disconnect between the media content and the geographic origin and context of the media content. This disconnect creates the problem of a recipient being unable to fully engage with or appreciate an item of media content shared by a user.

There is therefore a need for improving how a recipient may be provided with a greater appreciation of the geographic context of an item of media content.

SUMMARY OF INVENTION

The invention is defined by the claims, to which attention is now drawn.

In a first aspect of the invention, a method of sharing an item of media content comprises the steps of associating a first location with the item of media content at a first mobile device, sending the item of media content from the first mobile device to a second mobile device at a second location via a network, displaying on a graphical user interface at the second mobile device a simulated journey from the second location to the first location; and displaying at the second mobile device the item of media content, wherein the simulated journey from the second location to the first location includes displaying a map, identifying the first location and second location on the map, calculating a path from the second location to the first location on the map, generating and displaying a first animation stage based on the second location and comprising zooming out from the second location on the map, generating and displaying a second animation stage based on the calculated path and comprising following the path between the second location and the first location, and generating and displaying a third animation stage based on the first location and comprising zooming in to the first location on the map.

Embodiments of the invention may have the advantage of enabling a recipient of an item of media content to experience the media content with an improved geographical context and thus enjoy a greater connection and engagement with the media content.

An embodiment of the invention further comprises the step of sending an invitation to the second mobile device to view the item of media content. This has the advantage of providing greater security to a recipient of the item of user content.

In another embodiment of the invention displaying the simulated journey and sending the item of media content only occur if the invitation is accepted. This has the advantage of providing greater security to a recipient of the item of user content.

In another embodiment of the invention item of media content may be text, audio, still image, animation, video footage, or multimedia.

In another embodiment of the invention associating the first location with the item of media content may include associating a geotag with the item of media content, or identifying an existing geotag associated with the item of media content. This has the advantage of greater automation, as a user is not relied upon to provide the first location.

In another embodiment of the invention associating the first location with the item of media content may include associating Global Positioning System (GPS) coordinates with the item of media content. This has the advantage of greater automation, as a user is not relied upon to provide the first location.

In another embodiment of the invention associating the first location with the item of media content may include associating a manually selected location with the item of media content. This has the advantage of not relying upon external location services.

In another embodiment of the invention the manually selected location may be map coordinates, a postcode or a zip code.

In another embodiment of the invention a user associated with the first mobile device and a user of the second mobile device are members of the same social network. This has the advantage that a second user is known or already trusted by the first user.

Another embodiment of the invention further comprises the step of selecting a user associated with a second mobile device from a plurality of users that are members of the same social network.

Another embodiment of the invention further comprises the step of selecting a plurality of users each associated with a mobile device from a plurality of users that are members of the same social network. This has the advantage of sending the same media content to a plurality of recipients at the same time.

In a second aspect of the invention, a system of sharing an item of media content comprises one or more processors configured to associate a first location with the item of media content at a first mobile device, send the item of media content from the first mobile device to a second mobile device at a second location, display on a graphical user interface at the second mobile device a simulated journey from the second location to the first location and, display at the second mobile device the item of media content, wherein the simulated journey from the second location to the first location includes displaying a map, identifying the first location and second location on the map, calculating a path from the second location to the first location on the map, generating and displaying a first animation stage based on the second location and comprising zooming out from the second location on the map, generating and displaying a second animation stage based on the calculated path and comprising following the path between the second location and the first location, and generating and displaying a third animation stage based on the first location and comprising zooming in to the first location on the map.

Advantages provided by the second aspect of the invention are the same as those provided by the first aspect of the invention.

An embodiment of the invention further comprises the one or more processors configured to send an invitation to the second mobile device to view the item of media content.

In another embodiment the one or more processors may be configured to display the simulated journey and send the item of media content only if the invitation is accepted.

In another embodiment the item of media content may be text, audio, still image, animation, video footage, or multimedia.

In another embodiment the one or more processors may be configured to associate the first location with the item of media content by associating a geotag with the item of media content, or identifying an existing geotag associated with the item of media content.

In another embodiment the one or more processors may be configured to associate the first location with the item of media content by including associating Global Positioning System (GPS) coordinates with the item of media content.

In another embodiment the one or more processors may be configured to associate the first location with the item of media content by including associating a manually selected location with the item of media content.

In another embodiment the manually selected location may be map coordinates, a postcode or a zip code.

In another embodiment a user associated with the first mobile device and a user of the second mobile device are members of the same social network.

Another embodiment of the invention further comprises the one or more processors configured to select a user associated with a second mobile device from a plurality of users that are members of the same social network.

Another embodiment of the invention further comprises the one or more processors configured to select a plurality of users each associated with a mobile device from a plurality of users that are members of the same social network.

In a third aspect of the invention, a non-transitory computer readable medium storing a program causes one or more processors to execute sharing an item of media content comprises associating a first location with the item of media content and storing the first location and the item of media content in a data store located on a first mobile device, sending the item of media content from the first mobile device to a second mobile device at a second location via a network, displaying on a graphical user interface at the second mobile device a simulated journey from the second location to the first location and, displaying at the second mobile device the item of media content, wherein the simulated journey from the second location to the first location includes displaying a map, identifying the first location and second location on the map, calculating a path from the second location to the first location on the map, generating and displaying a first animation stage based on the second location and comprising zooming out from the second location on the map, generating and displaying a second animation stage based on the calculated path comprising following the path between the second location and the first location and, generating and displaying a third animation stage based on the first location and comprising zooming in to the first location on the map.

Advantages provided by the third aspect of the invention are the same as those provided by the first and second aspects of the invention.

Another embodiment of the invention comprises an computer program stored on a non-transitory medium of a mobile device for executing any of the steps above.

A further aspect of the invention, a mobile device for use in the system of the second aspect of the invention has software configured to receive at a second location an item of media content and a first location associated with the item of media content, display on a graphical user interface a simulated journey from the second location to the first location, and display the item of media content, wherein the simulated journey from the second location to the first location includes displaying a map, identifying the first location and second location on the map, calculating a path from the second location to the first location on the map, generating and displaying a first animation stage based on the second location and comprising zooming out from the second location on the map, generating and displaying a second animation stage based on the calculated path and comprising following the path between the second location and the first location, and generating and displaying a third animation stage based on the first location and comprising zooming in to the first location on the map.

DETAILED DESCRIPTION

Embodiments of the invention will now be described, by way of example only, and with reference to the accompanying drawings, in which:

FIGS. 3a to 3e show examples of a graphical user interface (GUI) of a mobile application;

Embodiments of the invention described below relate to how social media platforms may be enhanced by providing an improved use of location information associated with an item of media content. However, the invention is not limited to social media platforms and is related generally to improving the engagement of a recipient with an item of media content. Social media platforms enable forms of electronic communication between users. Examples of social media platforms include social networking sites such as Facebook™, Twitter™, LinkedIn™, Instagram™ and Snapchat™. Social media platforms enable users to form social networks defined by the relationships and interactions between users of the social media platform. Users forming a social network may share information, ideas, personal messages and other items of content. Some social media platforms may also provide opportunities to interact with users outside their social network, often in accordance with preference and security settings defined by the user.

Figure 1:
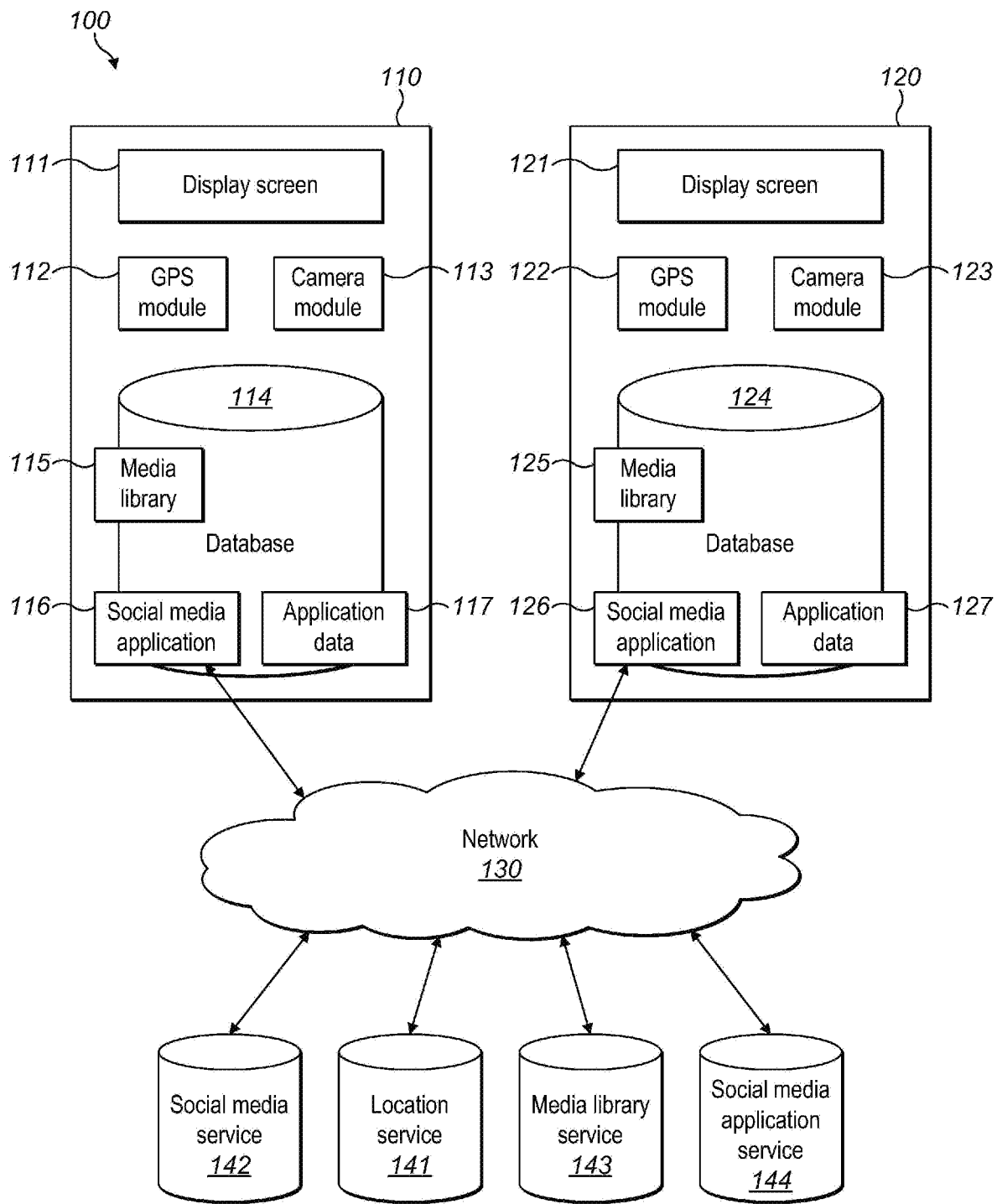
FIG. 1 shows a schematic block diagram of a system for sharing an item of media content embodying the invention.

FIG. 1 shows a block diagram of an example of a system 100 which may be configured to share an item of media content between two contacts in a social network.

As shown in FIG. 1, the example system 100 includes a first mobile device 110, a second mobile device 120, and various services accessed via a network 130.

The first mobile device includes: a display screen 111, a Global Positioning System (GPS) module 112, a camera module 113 and a local database 114. The local database includes a media library 115, a social media application 116 and associated application data 117. The display screen 111 of the mobile device may be for displaying items of media content to a user associated with the mobile device. The GPS module 112 may be for obtaining location information associated with the mobile device. The camera module 113 may be for recording items of media content. Examples of items of media content may include audio content, video content, text content, still image content or combinations thereof. Items of media content may also include video streams of live events. The items of media content may be stored or recorded in any suitable format, for example, .avi, .jpg, mpeg, .gif, .mp3, .mp4, or any other format. The local database 114 may be for storing data, including location data, social media data, local application data, and recorded media content.

The social media application 116 stored on the local database 114 enables a user to share items of media content with other users of the social media application. Embodiments described here relate to a social media application 116 which is a native application, however the application could alternatively be a web-based application. A native application is presently considered the preferred mode of operation as the application is able to directly interact with hardware such as camera and GPS modules in the mobile device. The social media application 116 includes API libraries, such as location and social media API libraries, business rules, GUI components and controllers, and a local application database.

The second mobile device 120 includes substantially the same modules, systems and applications as the first mobile device. The first and second mobile devices may be any suitable device including, but not limited to, cell or mobile phones, tablets, laptop computers and other smart devices.

The network includes connectivity to various remote services. As illustrated in FIG. 1, the network includes connectivity to location services 141, social media services 142, media library services 143, and a social media application service 144. The location services 141 may be any service which can provide a user's location as an alternative to, or in combination with, the GPS module 112, including mobile phone service provider information, location information self-reported by the user, and local-range technologies such as Bluetooth, RFID, and WLAN systems. The social media services 142 may include a social media website and social media data. Media library services 143 may be any service which enables a user to access remotely stored items of media content, for example Dropbox or other cloud-based storage options. Finally, the social media application service 144 is further described below with reference to FIG. 2 and includes a remote application database for remotely backing up social media application data.

The social media application 116 makes API requests to any of these services via the network 130. In response to each API request, the service provides the requested data to the social media application as an API response.

An example architecture for the social media application 116 and social media application service 144 will now be described with reference to FIG. 2.

As mentioned above, the social media application 116 in this embodiment is a native application which directly interfaces with features and hardware of the mobile device, such as a camera module 112, a GPS module 113 or an accelerometer. A native application is developed for use on a particular operating system, platform or device. Accordingly, the example shown in FIG. 2 includes multiple versions of the native application 210 which are required to cater for the different programming languages used by the three most popular mobile operating systems: iOS™ 210a, Android™ 210b and Windows™ 210c. However, these are merely illustrative examples of operating systems and are not intended to be limiting.

Figure 2:
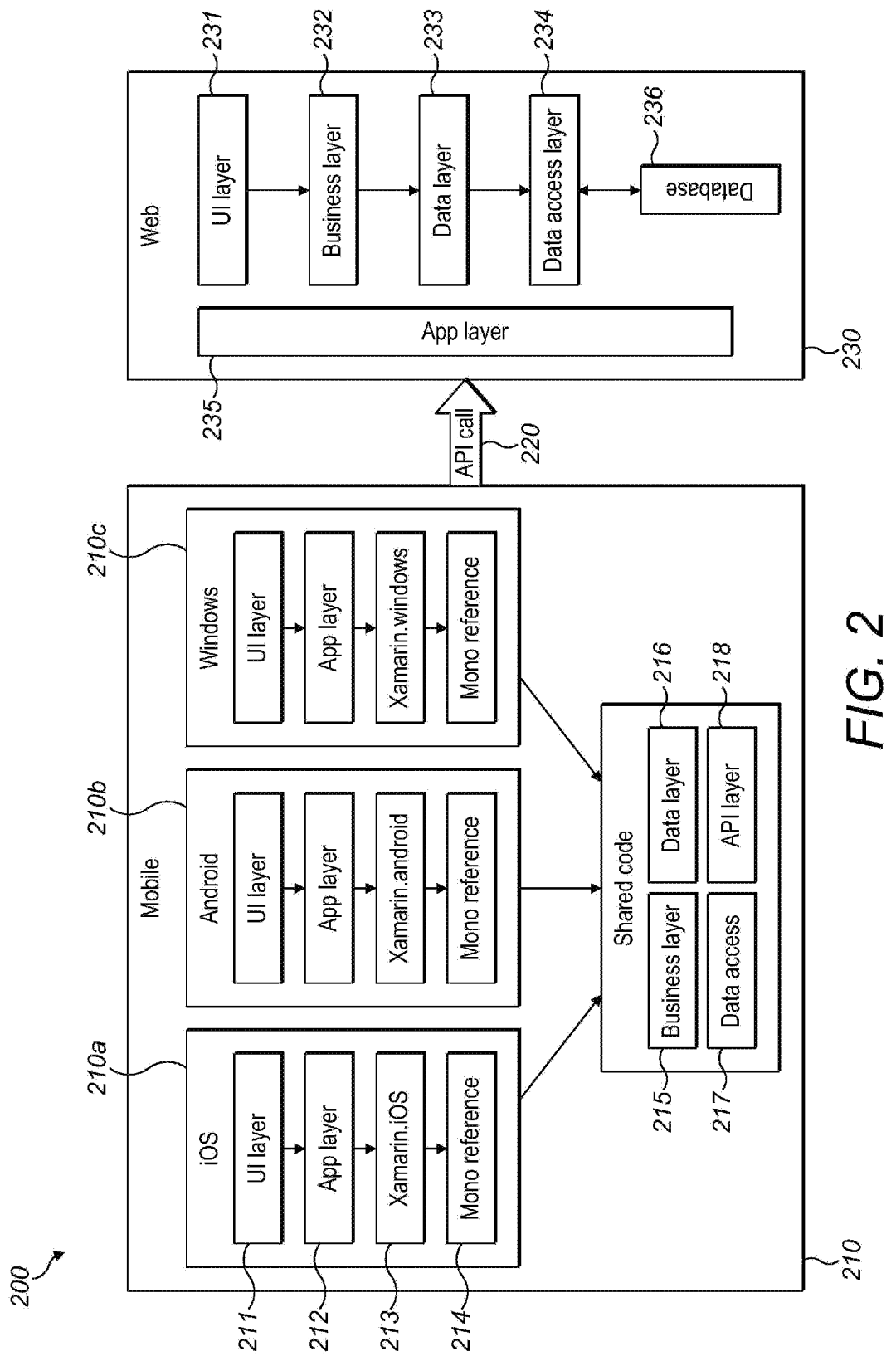
FIG. 2 shows a schematic diagram of an example architecture for a mobile application.

As shown in FIG. 2, each operating system architecture includes a User Interface (UI) layer 211, an Application layer 212, an Abstraction layer 213 and a Reference layer 214. The UI layer 211 contains components of the social media application which are visible to a user of the social media application and which allow the user to interact with the social media application. The UI is further discussed below with reference to FIG. 3. The Application layer 212 contains application-specific logic. The Abstraction layer 213 is a cross-platform software layer which enables programming code to be mapped to native controls of the operating system. The abstraction layer may, for example, be implemented using Xamarin™ software provided by Microsoft®. The Reference layer 214 makes calls to the mobile device to access features of the mobile device. For example, the Reference layer 214 may request to access the media library stored in the mobile device database, or may request access to the mobile device camera module. The Reference layer 214 may, for example, be implemented using the open-source Mono™ software provided by Microsoft™.

Common to each operating system architecture are the Shared Code layers, which includes a Business layer 215, a Data layer 216, a Data Access layer 217 and an API layer 218. The Business layer 215 includes business rules and workflows which determine how the social media application operates. The Data layer 216 determines how the social media application interacts with the data gathered and requested. The Data Access layer 217 determines how data is saved in a database, which may reside on the mobile device or may reside at a remote location accessed via a network. The API layer 218 handles API calls 220 made from the mobile application to a service via the network.

Although the example in FIG. 2 shows the mobile-based native application 116 making an API request to a web-based social media application service 144, it should be understood that the application may make API calls to other available services in a similar manner.

The social media application service 144 includes a web-based application 230, as shown in FIG. 2. The architecture of the web-based application 230 includes a UI layer 231, a Business layer 232, a Data layer 233, a Data Access layer 234 and an Application layer 235. The operation of each of these layers is equivalent to those discussed above for the mobile application system architecture, however the Application layer 235 operates over the UI, Business, Data and Data Access layers in the service architecture. The service also includes a service database 236. Data stored on the database 236 is provided to the social media application 116 in response to API requests 220. The above service architecture is illustrative only, and other services, such as location services and media library services, need not be configured in the same way as the specific example above.

The above described system 100 enables a first user to send an invitation to view an item of media content with a second user, as further described below. The first mobile device 110 is associated with a first user and the second mobile device 120 is associated with a second user. In some embodiments, the first and second users are part of a social network within a community of users of the social media application 116.

FIGS. 3a to 3e show an example graphical user interface (GUI) 300 for a social media application 116 which enables a user to share an item of media content with a recipient. As shown in FIGS. 3a to 3e, the GUI 300 includes a plurality of information pages 300a to 300e.

Although not fully illustrated in FIGS. 3a to 3e, each information page includes common features. For example, each information page of the example GUI in FIGS. 3a to 3e includes a page name 302, a new notification icon 303, a menu icon 304 and shortcuts to other information pages 305. The new notification icon 303 identifies the number of new notifications received by a user account. The menu icon 304 enables a user to access an account information page or an account settings page which enables the user to view or modify their user account details and settings. The shortcuts 305 to other information pages enables a user to navigate around the GUI 300 and also enables the user to view a variety of content.

The example GUI shown in FIG. 3 includes a News Page 300a, an Accepted Experiences Page 300b, a Profile Page 300c to 300d and a Share Page 300e.

The News Page 300a lists public invitations to view media content from a user's social network. In addition to the common features described above, the example News Page 300a shown in FIG. 3a includes a list of user events 310a to 310c which each include an item of media content. The list of user events may be ordered so that the most recent request is located at the top of the list. Each user event that appears in the GUI includes author information 312, a media preview window 313, a media content descriptor 314, an interaction icon 315, a view/review content button 316, a share/re-share content button 317, or a report content icon 318. The author information 312 provides information to the user about the author of the user event and may include an author name and an author profile image. The media preview window 313 includes a high resolution image indicating the identity of the media content. The high resolution image may be a frame taken from the item of media content, or another image chosen by the author of the user event. The media content descriptor 314 identifies the title or nature of the media content being shared by the author. The interaction icon 315 indicates the popularity of the user event and allows the user to interact with media content. For example, the user may be able to use the interaction icon to indicate that they like the media content. The view/review content button 316 causes a simulation to be presented to the viewer before the item of media content is displayed, as further described below. The share/re-share content button 317 enables a user event which has not already been made public to be shared or to re-share a user event which has already been made public. The report content icon 318 enables a user to report if an item of media content contains inappropriate content and should be removed. A user profile can also be reported for inappropriate use using a report content icon.

The Accepted Experience Page lists a history of invitations to view media content that a user has accepted. The example Accepted Experience Page 300b includes both private and public invitations to view media content from a user's social network. The Accepted Experience Page 300b displays the user events in a similar manner to the News Page 300a, as described above. Accordingly, in the example UI shown, each user event listed on the Accepted Experience Page 300b includes author information 312, a media preview window 313, a media content descriptor 314, a view content button 316 and a report content icon 318.

The Profile Page 300c-d displays user account information 320. In the example shown in FIGS. 3c and 3d, the user account information includes personal information associated with a user account, such as a user profile image 321, a user name 322, a tag line 323, user social network information 324 and an edit profile button 325. The user profile image 321 is an image chosen by the user to represent themselves. For example, the user profile image 321 may be a personal photograph for an individual or a logo for a corporation. The user name 322 indicates the name of the user. The tag line 323 is a short user-provided description of themselves. The tag line 323 may provide a further means of identifying or differentiating a user account from other similar accounts. The user social network information 324 indicates how many user accounts the user is following and how many user accounts are following the user. The edit profile button 325 launches a user profile settings page which enables the user to edit their user account profile information 320. The user profile settings page allows the user to determine which personal information is publicly available by choosing which user account profile information is included on the Profile Page 300c and 300d.

The Profile Page 300c and 300d also displays a log of user events associated with the user account. In the example shown in FIG. 3c, the Profile Page displays the contents of a first tab named Saved Experiences 330. The Saved Experiences tab 330 includes a list of private user events 310 which may only be accessed by the user. Each user event 310 listed in the Saved Experiences tab 330 includes the features recited above. In the example shown in FIG. 3c, each user event 310 includes a media preview window 313, a media content descriptor 314 and a share content button 317.

Figure 3D:
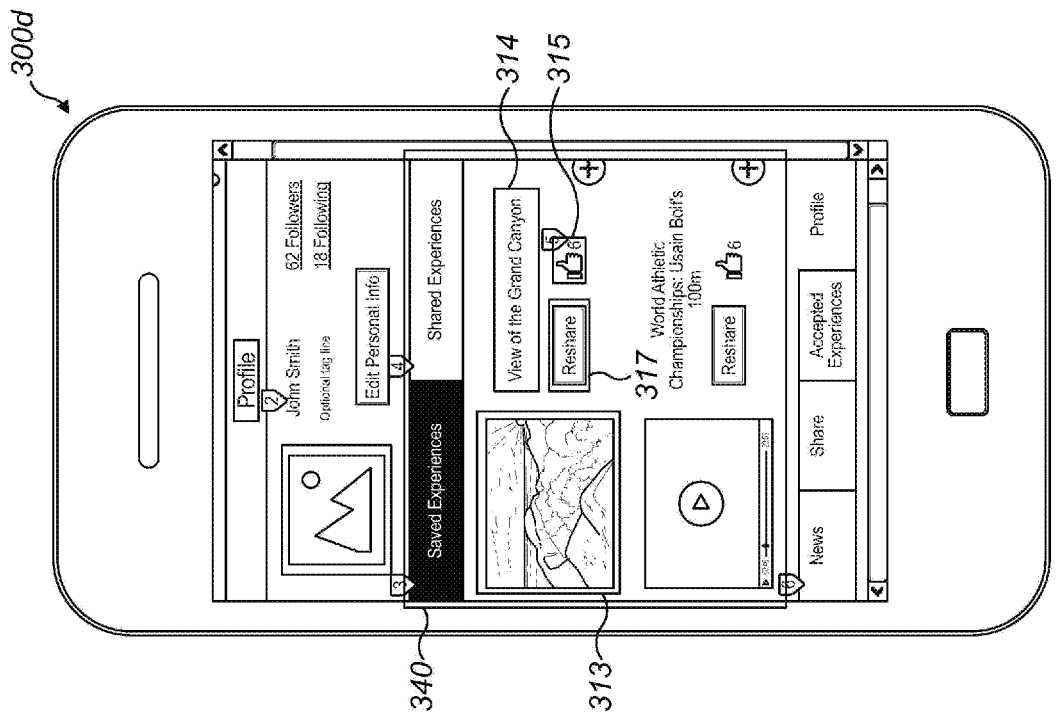
Figure 3C:
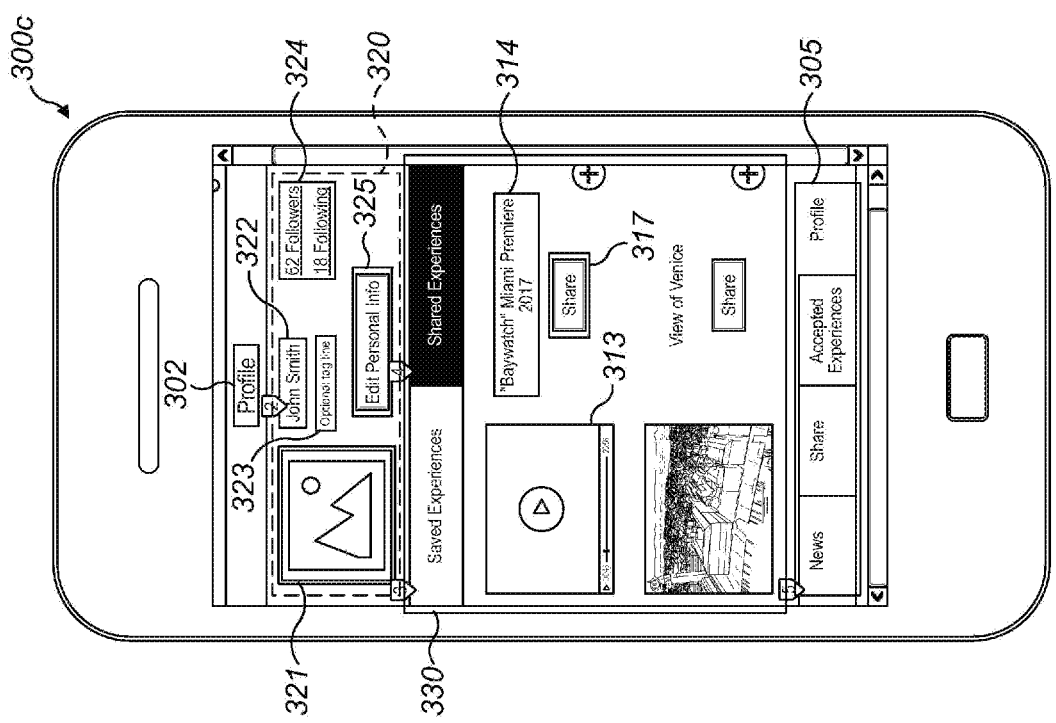
Figure 3E:
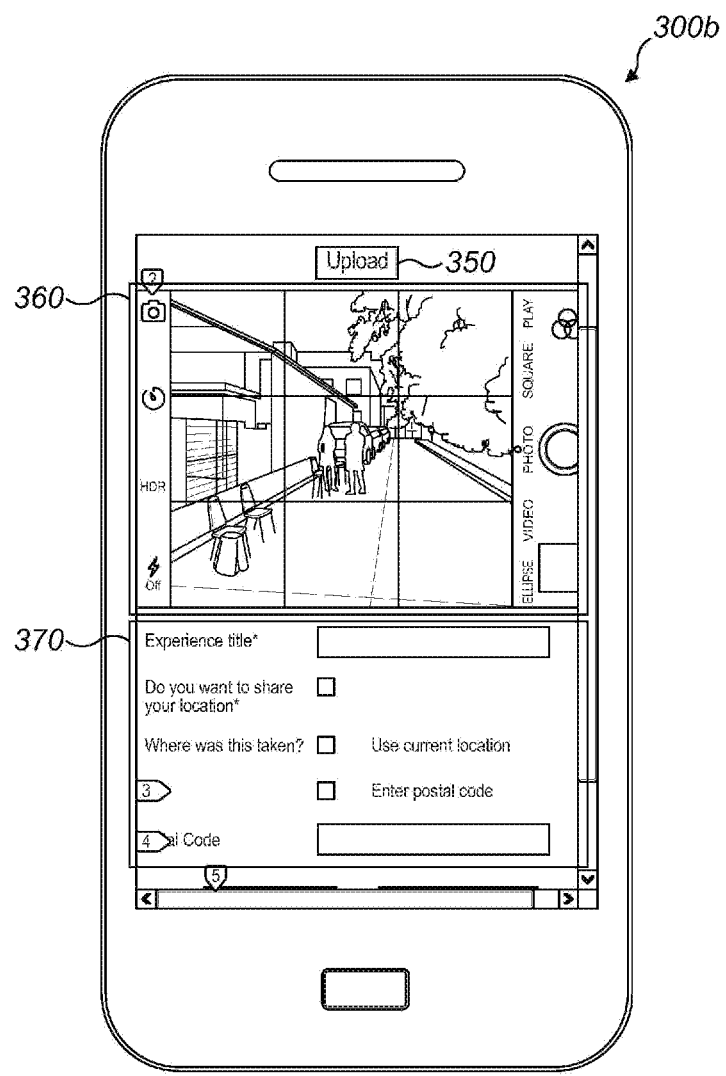

In the example shown in FIG. 3d, the Profile Page displays a second tab named Shared Experiences 340. The Shared Experiences tab 340 includes a list of public user events which have been shared with accounts that follow the user. Each user event 310 listed in the Shared Experiences tab 340 may include the features recited above. In the example shown in FIG. 3d, each user event 310 includes a media preview window 313, a media content descriptor 314, an interaction icon 315 and a re-share content button 317.

The Share Page 300e enables a user to upload an item of media content to their user account. In the example shown in FIG. 3e, the Share Page 300e includes an upload button 350, a preview window 360, and a media content information panel 370.

The upload button 350 allows a user to select an item of media content from a media library or to capture a new item of media content using a camera module 113. The media library may be a media library 115 stored locally on the mobile device 101, or stored remotely in a media library service 143 accessed via a server 130. Opting to upload an image from the camera module 113 may launch the native mobile device camera application, or may launch a connection with an external camera. The preview window 360 allows a user to preview the item of media content before it is finally uploaded. The user may then decide to edit the media content or choose a different item of media content.

The media content information panel 370 allows a user to attribute media content information to the item of media content. In the example shown in FIG. 3e, the user may include a content descriptor and location information. If the user chooses to share location information, the item of media content may be geotagged using GPS coordinates. Alternatively, the location information may be associated with the item of media content by manually assigning the location information. This may be done by selecting the current location or by manually inputting a post code associated with the location of the item of media content. Alternatively, the current location may be selected by manually inputting a zip code.

The user decides whether to share the item of media content with their social network, or to save the item of media content for sharing later. The user may choose to share the item of media content with their entire social network, or only a selected number of contacts within their social network. Alternatively, the item of media content may be saved to the Saved Experiences tab 330 of the Profile Page 330c if the user does not want, or is unable, to share the item of media content straightaway.

Embodiments of the invention enable a user to share an item of media content with a recipient by enabling the media sharing application 116 located on the first mobile device 110 to interact with the media sharing application 126 located on the second mobile device 120 via the network 130. For example, the first user may use the system to send an invitation to view an item of media content to a second user as further described with reference to FIG. 4.

Figure 4:
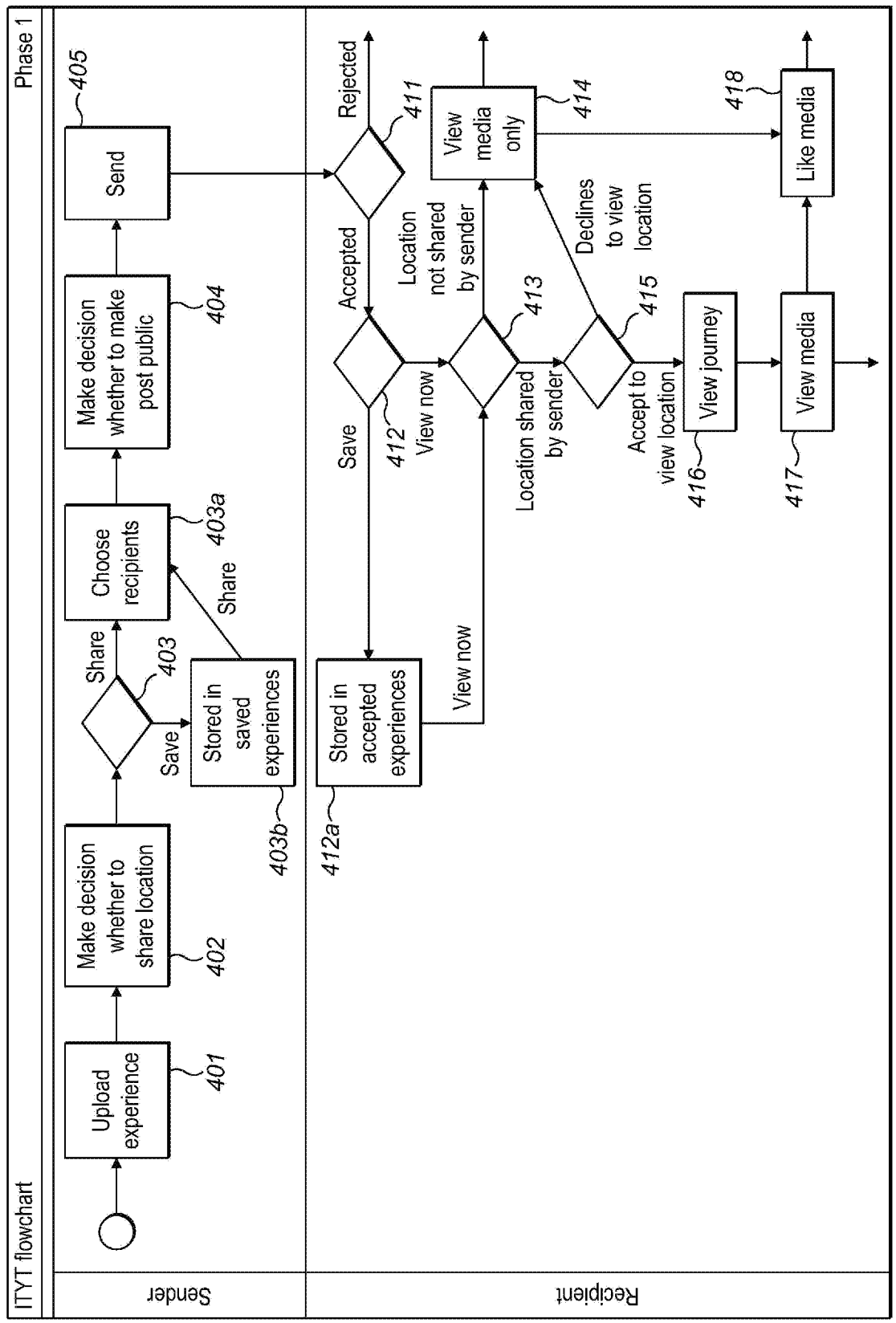
FIG. 4 shows a schematic flow diagram of the interactions of a user and a recipient with the mobile application.

FIG. 4 shows an example process flowchart of how a user may send an item of media content to a recipient. In a first step 401, a user uploads an item of media content to the social media application. As discussed above, the item of media content may be sourced directly from the mobile device by the Reference layer 214 which may send a request to a media library 115 stored on a local database or to a camera module 113. Alternatively, the item of media content may be sourced from an external service by placing an API call to a media library service 143 via a network 130.

In a next step 402, the user decides whether or not to share the location information associated with the item of user content. In an embodiment, the location associated with the item of user content may be the location of the mobile device. In a further embodiment, the location of the mobile device is a first location. Location information associated with the item of user content may be obtained directly from the mobile device by the Reference layer 214 which may identify a geotag associated with the item of media content. Alternatively, the Reference layer 214 may send a request to a GPS module 113 of the mobile device. Location information may also be obtained by the API layer 218 which may send an API request 220 to a location service 141 via a network 130. For example, the API layer 218 may send a request to a location service including a database of postcodes or zip codes. Associating location information with the item of media content provides several advantages described below. However, enabling the user to omit location information can also advantageously provide greater anonymity and privacy.

In a next step 403, the user then decides whether to share the item of media content or to save it for later. If the user decides to immediately share the item of media content, the application launches a list of the user's social network contacts retrieved from a social media database. The user then selects which of these contacts will receive an invitation to view the item of media content in step 403a. In some instances, the user may be unable or unwilling to share the item of media content immediately and may store the item of media content in step 403b. For example, if the mobile device is unable to access the network 130 or one of the remote services, the item of media content is saved until a time when the network 130 or remote services can be accessed. If the item of media content is saved, the Reference layer 214 may store the media content in a mobile device database. The item of media content is then displayed in the Saved Experiences tab 330 of the user's Profile Page 300c. Alternatively, the item of media content may be stored by an external service which may be achieved by placing an API call 220 to a medial library service 143 via a network 130. Once stored, the user may access the item of media content at a later time and may choose to then share the media content with their contacts as described above.

In a further step 404, the user additionally decides whether to make the item of media content public to their whole social network. As before, individual invitations are sent and the item of media content is displayed as a media event on the News Page 300a of each member of the user's social network.

Once the user has chosen at least one recipient from the list of social network contacts, the application sends an invitation to each of the recipients inviting them to view the item of media content in step 405.

On receiving an invitation to view an item of media content, a recipient may either accept the invitation or reject it in a first step 411. Accepting the invitation may not require the recipient to view the media content immediately. In the example illustrated in FIG. 4, a recipient may subsequently decide in step 412 whether to save the media content, or choose to view it immediately. If the recipient chooses to save the media content, it is stored in the Accepted Experiences page 300b as a user event 310 in step 412a.

As shown in FIG. 4, the mobile application assesses whether a location is associated with the item of media content in step 413. This is performed by the Data layer 216 of the mobile application. If a location is not associated with the item of media content, the mobile application displays only the item of media content to the recipient in step 414.

If a location is associated with the item of media content, then the user decides whether to view the location in step 415. If the user rejects viewing the location, then the mobile application displays only the item of media content to the recipient as above in step 414. If the user chooses to view the location, then a journey simulation including the location is displayed to the recipient in step 416 before displaying the item of media content in step 417, as further described below with reference to FIG. 5.

In a final step 418, the recipient is able to interact with the media content. For example, the recipient may use the interaction icon 315 to register that they like the media content.

As may be seen from FIG. 4, embodiments of the invention provide the recipient with a high degree of control over the process of viewing items of media content. The recipient may choose whether to accept the items of media content from a sender, whether to view the content, when to view the media content and whether to save the media content. The recipient may therefore guard against viruses, spam and fraud attempts by only choosing to accept invitations from senders recognised by the recipient. The inclusion of an invitation therefore introduces control, security and privacy into the process of sharing media content between users.

With regard to FIG. 5, embodiments of the invention include displaying an animation sequence comprising a journey simulation from a location associated with the item of media content to a recipient's location. FIGS. 5a to 5l illustrate an example of a journey simulation that is displayed between a location associated with an item of media content and a recipient. In the example shown, video footage of a sports event is shared by a user with a social media contact. As indicated above, the recipient of the media content may only view the journey if they have provided their consent.

Figure 5C:
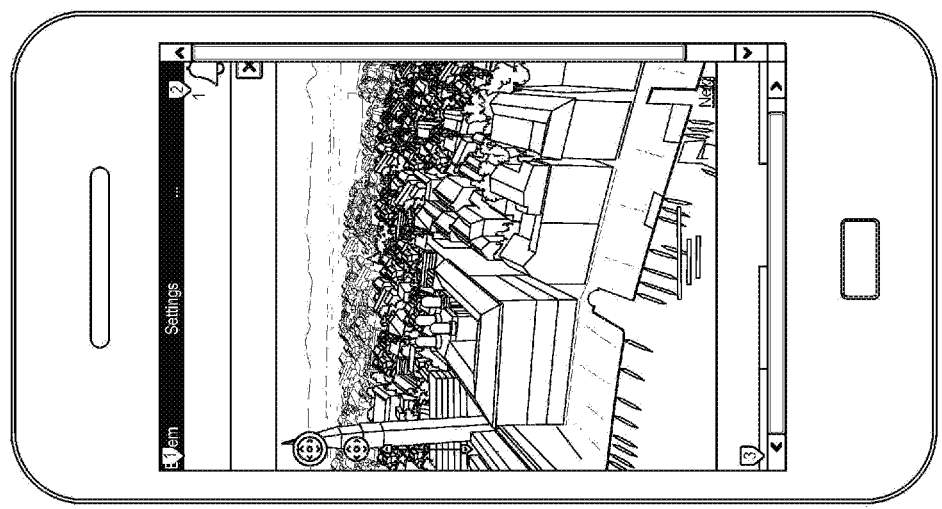
FIGS. 5a to 5l show an example representation of a simulated journey embodying the invention.
Figure 5B:
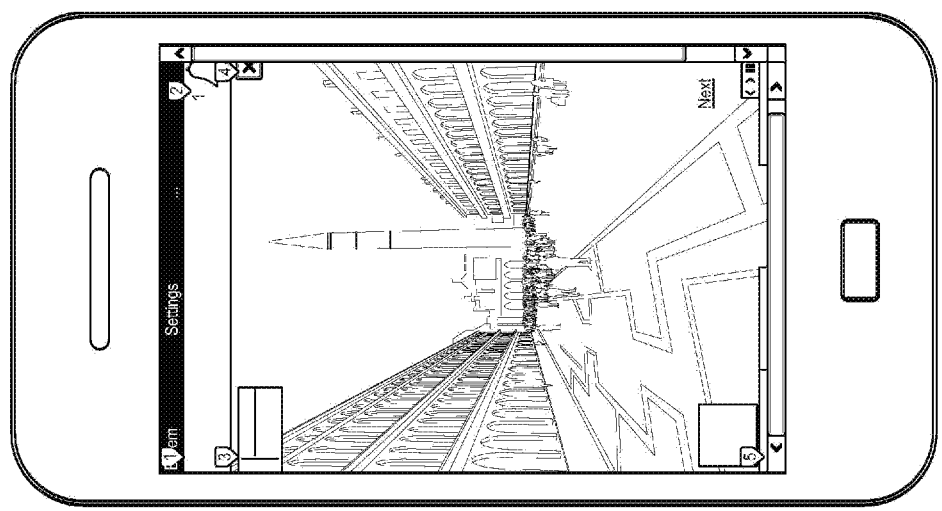
Figure 5A:
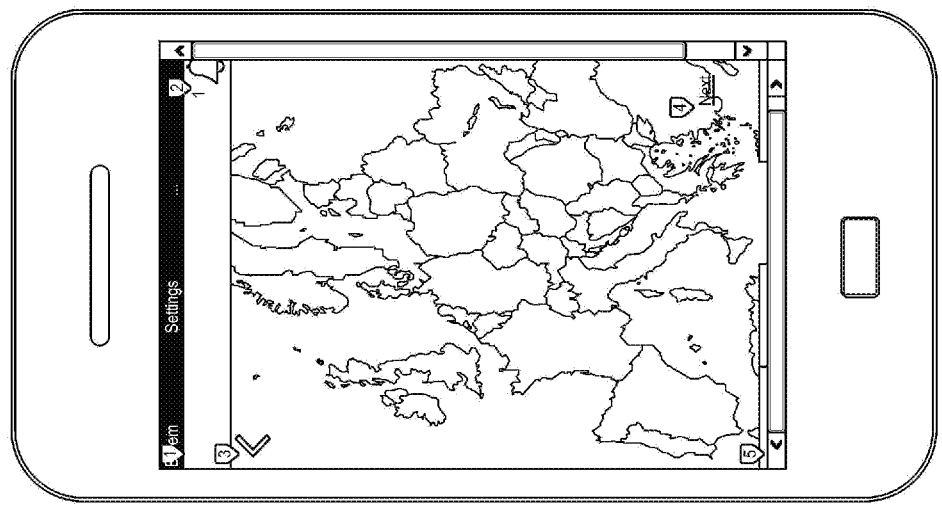
Figure 5F:
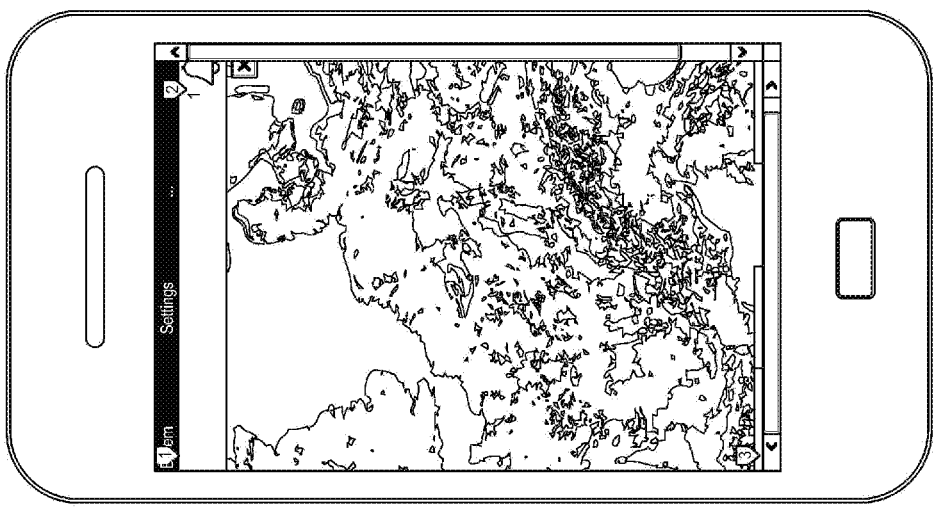
Figure 5E:
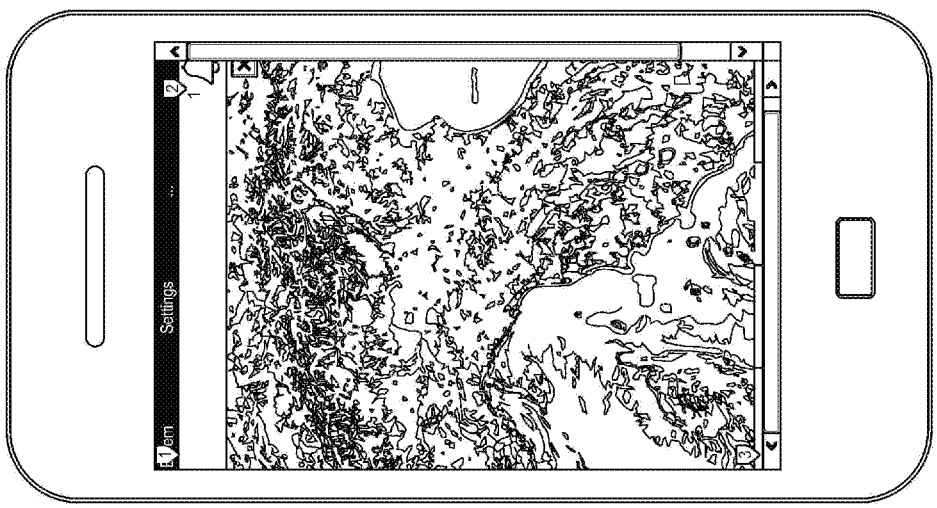
Figure 5D:
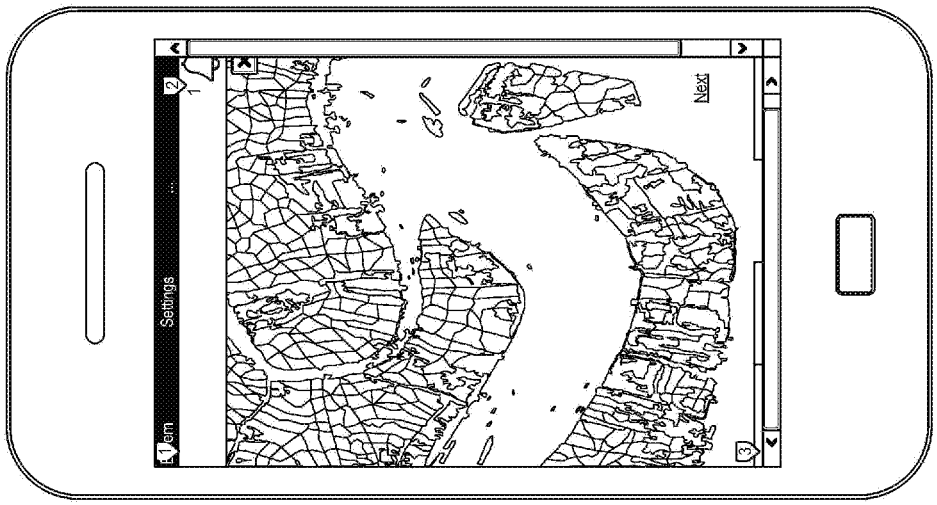
Figure 5I:
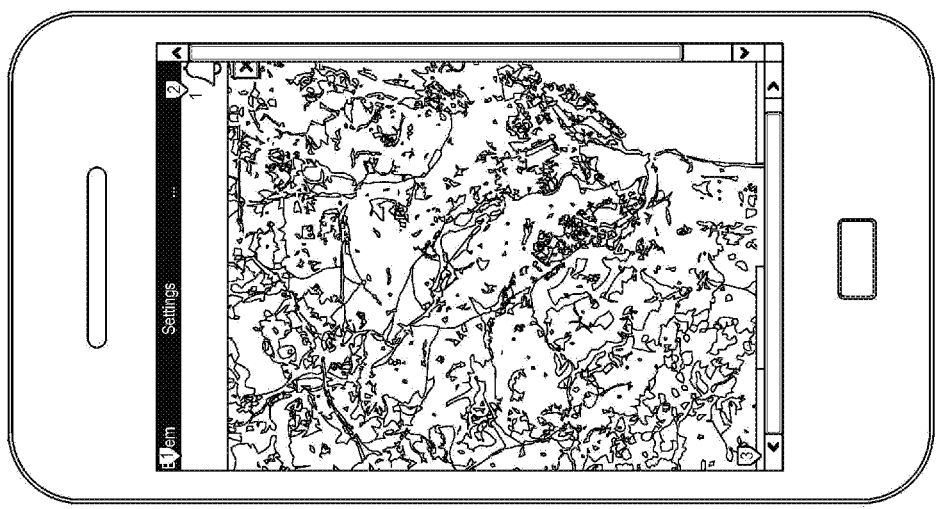
Figure 5H:
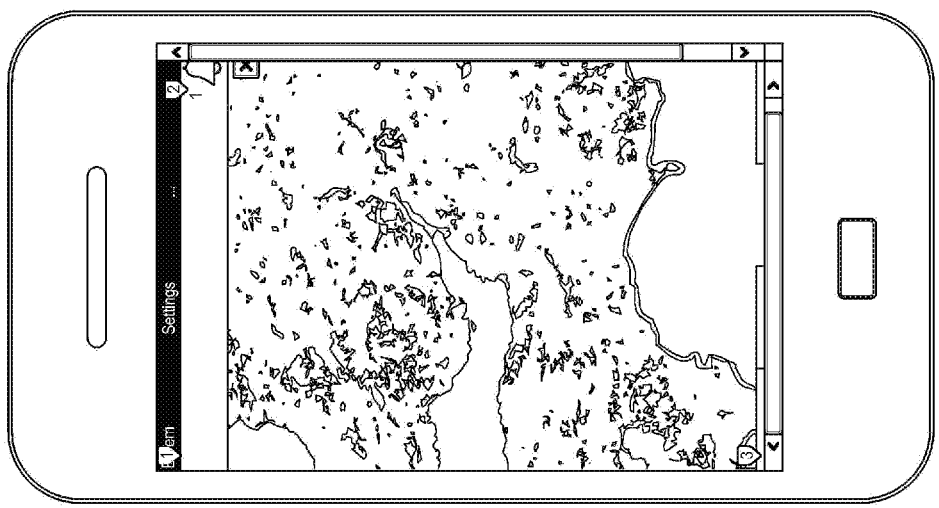
Figure 5G:
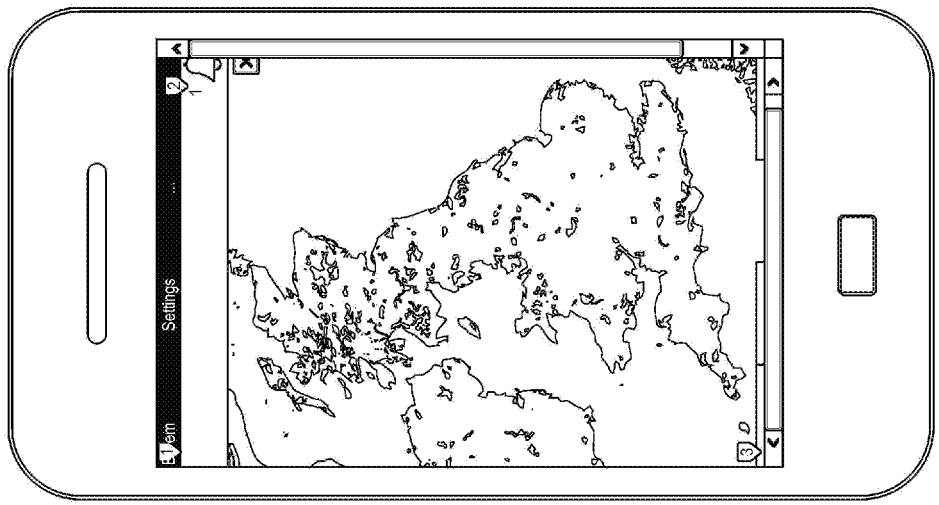
Figure 5L:
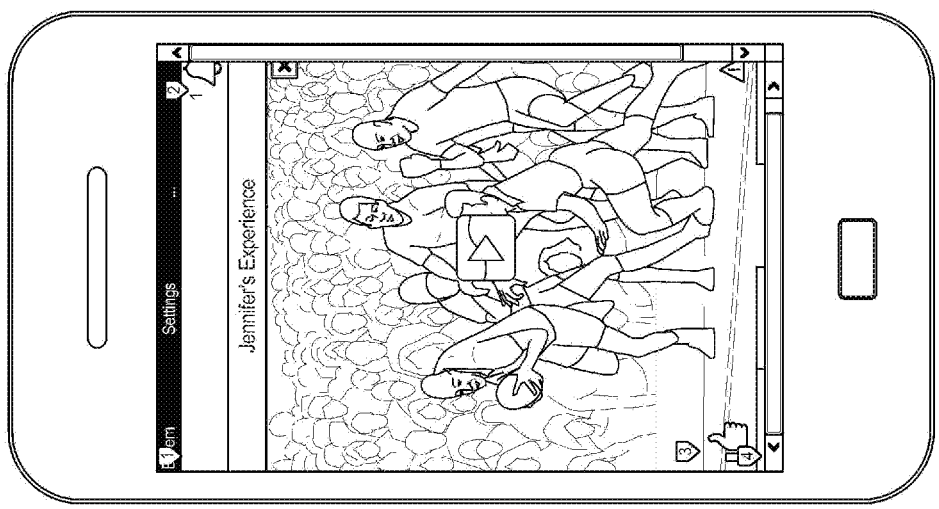

In a first stage of the journey simulation, the locations of the user and the recipient are identified on a map or a globe, as shown in FIG. 5a. The mobile application 126 may identify the recipient's current location by sending a request to the GPS module 123 of the recipient's mobile device 120 or by sending an API request 220 to a location service 141 via a network 130. The Data layer 126 of the mobile application 126 then identifies a location associated with the item of media content. The recipient's location and a location associated with the user are plotted on the map or globe. In a particular embodiment, this may be achieved via integration with location services 141, such as Google Earth™, accessed via the API layer 218.

In a next stage, the mobile application 126 calculates and displays a direct path, or route, between the two locations (not shown in the figures). A direct path or route for the purposes of this description is one that is a straight undeviating course between two locations. As before, a specific embodiment may achieve this through integration with location services 141, such as Google Earth, accessed via the API layer 218. For example, the API layer may request the latitude and longitude for each location, if these are not already known, and plot a direct path between each location using the latitude and longitude of each of the locations.

In a next stage, the journey simulation zooms out from a view associated with the recipient's location on the map. The zoom out is performed in accordance with a defined animation sequence. FIGS. 5b to 5e show representative stills of a zoom-out animation sequence from a street view of the recipient's location in Venice, to a view of northern Italy from space, as presented to the user.

In a next stage, the journey simulation smoothly navigates to the user's location by panning from the recipient's location to the user's location following the calculated direct path (shown in FIGS. 5e to 5g) after the initial zoom-out animation sequence. During this stage, the simulation displays topographical features which would be seen if journeying from the recipient's location to the user's location, thereby giving the impression of travelling or flying between each location along an aerial path. In the example shown in FIG. 5, the animation sequence would follow an aerial path between Italy and the United Kingdom, flying across the European continent via the Alps (shown in FIG. 5f), and across the English Channel to the United Kingdom. In some embodiments, if the two locations are in separate continents, the animation sequence may include flying above the atmosphere and seeing oceans and continents pass below. In other embodiments, if the two locations are on the same continent or in the same country, the animation sequence may include flying slightly lower and accordingly seeing a more detailed view of the landscape features below.

Figure 5K:
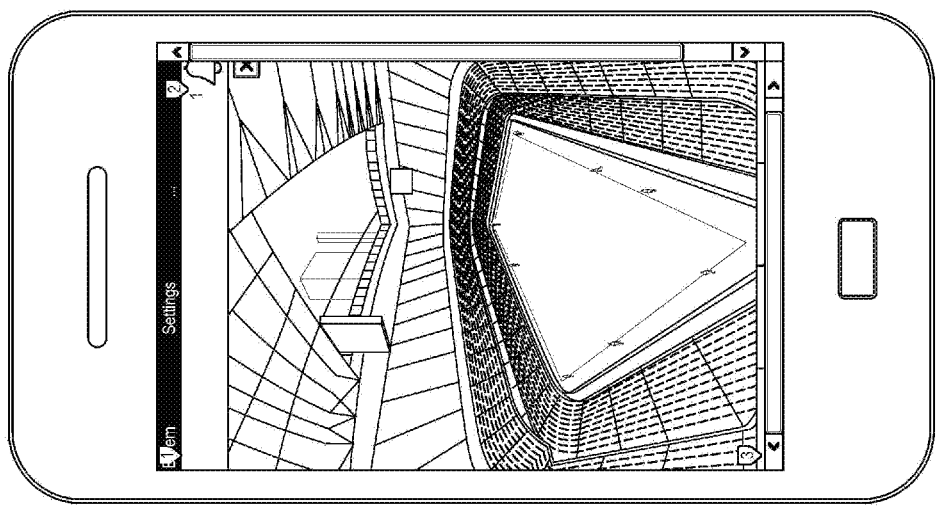
Figure 5J:
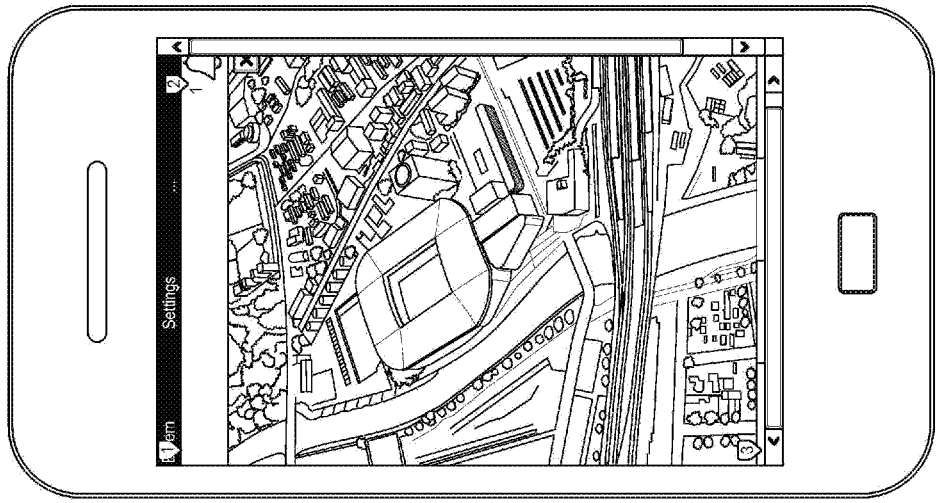

In a final stage, the journey simulation then zooms in to the location associated with the item of media content according to a defined animation sequence. The zoom in is performed in accordance with a defined animation sequence. FIGS. 5g to 5k show representative stills of a zoom-in animation sequence from a view of the United Kingdom to a street view of the location associated with the item of media content in Cardiff. If the location associated with the item of media content is a well-known landmark or venue, the animation sequence may also include an open source image of the landmark or venue, as illustrated in FIG. 5k, obtained from a media library service 143.

In practice, the animation sequence may comprise a large number of images sequenced together to create an animation.

Once the journey simulation has been displayed, the item of media content is displayed. In the example shown in FIG. 5l, the item of media content is a video of a rugby match between England and Wales in Cardiff.

Embodiments of the invention described above provide the advantage of enabling a recipient of an item of media content to experience the media content within an improved geographical context and thus enjoy a greater connection and engagement with the media content. The simulation also has the advantage of enabling the recipient to share the user's experience at a location associated with the user. This is because embodiments of the invention remove the disconnection between the user's location and the recipient's location and allows the recipient to experience the sensation of journeying across a geographic region to the user's location and witnessing an experience or event shared by the user. The geographic region may be a city, a country, a continent, or the globe.

The above detailed description of embodiments of the invention are not intended to be exhaustive or to limit the invention to the precise form disclosed. For example, while processes or blocks are presented in a given order, alternative embodiments may perform routines having steps, or employ systems having blocks, in a different order, and some processes or blocks may be deleted, moved, added, subdivided, combined, and/or modified. Each of these processes or blocks may be implemented in a variety of different ways. Also, while processes or blocks are at times shown as being performed in series, these processes or blocks may instead be performed in parallel, or may be performed at different times.

The teachings of the above embodiments can be applied to other systems, not necessarily the system described above. The elements and acts of the various embodiments described above can be combined to provide further embodiments.

While some embodiments of the inventions have been described, these embodiments have been presented by way of example only, and are not intended to limit the scope of the disclosure. Indeed, the novel methods and systems described herein may be embodied in a variety of other forms; furthermore, various omissions, substitutions and changes in the form of the methods and systems described herein may be made without departing from the invention.

What is claimed:

1. A method of sharing an item of media content comprising the steps of:
    associating a first location with the item of media content at a first mobile device;
    sending the item of media content from the first mobile device to a second mobile device at a second location via a network;
    displaying on a graphical user interface at the second mobile device a simulated journey from the second location to the first location; and
    displaying at the second mobile device the item of media content;
    wherein the simulated journey from the second location to the first location includes:
    displaying a map;
    identifying the first location and second location on the map;
    calculating an aerial path from the second location to the first location on the map;

generating and displaying a first animation stage based on the second location and comprising zooming out from the second location on the map;

generating and displaying a second animation stage based on the calculated aerial path and comprising following the aerial path between the second location and the first location; and, generating and displaying a third animation stage based on the first location and comprising zooming in to the first location on the map.

2. The method of claim 1, further comprising the step of sending an invitation to the second mobile device to view the item of media content.

3. The method of claim 2, wherein displaying the simulated journey and sending the item of media content only occur if the invitation is accepted.

4. The method of claim 1, wherein the item of media content comprises one of text, audio, still image, animation, video footage, or multimedia.

5. The method of claim 1, wherein associating the first location with the item of media content comprises one of associating a geotag with the item of media content, or identifying an existing geotag associated with the item of media content.

6. The method of claim 1, wherein associating the first location with the item of media content comprises one of associating Global Positioning System (GPS) coordinates with the item of media content.

7. The method of claim 1, wherein the aerial path is a direct path between the first and second locations.

8. A system of sharing an item of media content comprising one or more processors configured to:

associate a first location with the item of media content at a first mobile device;

send the item of media content from the first mobile device to a second mobile device at a second location;

display on a graphical user interface at the second mobile device a simulated journey from the second location to the first location; and display at the second mobile device the item of media content;

wherein the simulated journey from the second location to the first location includes:

displaying a map;

identifying the first location and second location on the map;

calculating an aerial path from the second location to the first location on the map;

generating and displaying a first animation stage based on the second location and comprising zooming out from the second location on the map;

generating and displaying a second animation stage based on the calculated aerial path and comprising following the aerial path between the second location and the first location; and, generating and displaying a third animation stage based on the first location and comprising zooming in to the first location on the map.

9. The system of claim 8, wherein the one or more processors is further configured to send an invitation to the second mobile device to view the item of media content.

10. The system of claim 9, wherein the one or more processors is configured to display the simulated journey and send the item of media content only if the invitation is accepted.

11. The system of claim 8, wherein the item of media content comprises at least one of text, audio, still image, animation, video footage, or multimedia.

12. The system of claim 8, wherein the one or more processors is further configured to associate the first location with the item of media content by associating a geotag with the item of media content, or identifying an existing geotag associated with the item of media content.

13. The system of claim 8, wherein the one or more processors is further configured to associate the first location with the item of media content by including associating Global Positioning System (GPS) coordinates with the item of media content.

14. The system of claim 8, wherein the aerial path is a direct path between the first and second locations.

15. A non-transitory computer readable medium storing a program causing one or more processors to execute sharing an item of media content comprising:

associating, using a processor, a first location with the item of media content and storing the first location and the item of media content in a data store located on a first mobile device;

sending, via a transmitter, the item of media content from the first mobile device to a second mobile device at a second location via a network;

displaying on a graphical user interface at the second mobile device a simulated journey from the second location to the first location; and displaying on a screen at the second mobile device the item of media content;

wherein the simulated journey from the second location to the first location includes:

displaying a map on a graphical user interface;

identifying, using the processor, the first location and second location on the map;

calculating, using a processor, an aerial path from the second location to the first location on the map;

generating, using a processor, and displaying, on a screen, a first animation stage based on the second location and comprising zooming out from the second location on the map;

generating, using a processor, and displaying, on the screen, a second animation stage based on the calculated aerial path and comprising following the aerial path between the second location and the first location; and, generating, using a processor, and displaying, on the screen, a third animation stage based on the first location and comprising zooming in to the first location on the map.

16. A computer program product being embodied in a non-transitory computer readable medium and comprising computer instructions being executed on a mobile device for:

associating a first location with the item of media content at a first mobile device;

sending the item of media content from the first mobile device to a second mobile device at a second location via a network;

displaying on a graphical user interface at the second mobile device a simulated journey from the second location to the first location; and displaying at the second mobile device the item of media content wherein the simulated journey from the second location to the first location includes:

displaying a map;

identifying the first location and second location on the map;

calculating an aerial path from the second location to the first location on the map;

generating and displaying a first animation stage based on the second location and comprising zooming out from the second location on the map;

generating and displaying a second animation stage based on the calculated aerial path and comprising following the aerial path between the second location and the first location; and, generating and displaying a third animation stage based on the first location and comprising zooming in to the first location on the map.

17. The computer program product of claim 16, further comprising computer instructions for sending an invitation to the second mobile device to view the item of media content.

18. The computer program product of claim 17, wherein the computer instructions for displaying the simulated journey and sending the item of media content are executed only if the invitation is accepted.

19. The computer program product of claim 16, wherein the computer instructions for associating the first location with the item of media content further comprises computer instructions for associating a geotag with the item of media content, or identifying an existing geotag associated with the item of media content, or wherein the computer instructions for associating the first location with the item of media content comprises the computer instructions for associating Global Positioning System (GPS) coordinates with the item of media content.

20. A mobile device for use in the system of claim 8, having software that, when executed by a processor, configures the mobile device to:

receive at a second location an item of media content and a first location associated with the item of media content;

display on a graphical user interface a simulated journey from the second location to the first location; and display the item of media content;

wherein the simulated journey from the second location to the first location includes:

displaying a map;

identifying the first location and second location on the map;

calculating an aerial path from the second location to the first location on the map;

generating and displaying a first animation stage based on the second location and comprising zooming out from the second location on the map;

generating and displaying a second animation stage based on the calculated aerial path and comprising following the aerial path between the second location and the first location; and, generating and displaying a third animation stage based on the first location and comprising zooming in to the first location on the map.

\* \* \* \* \*